Figure 3:
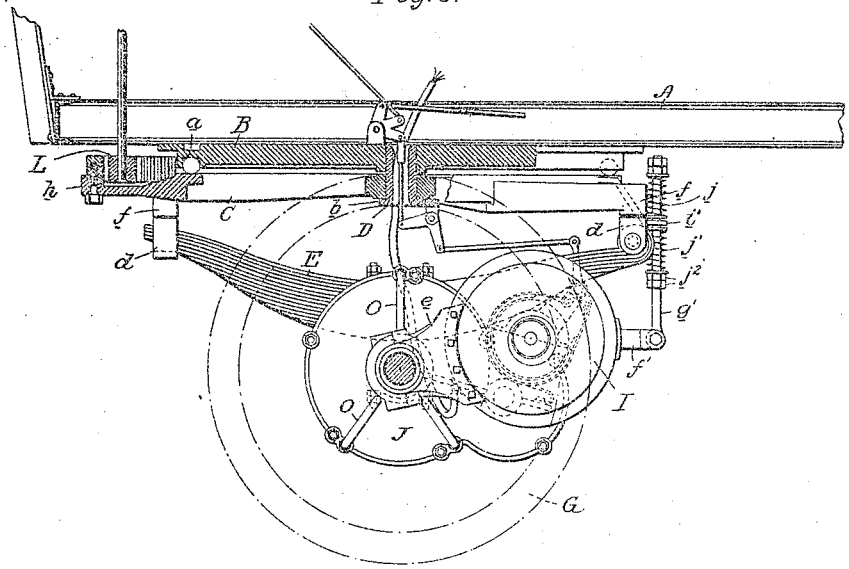

No. 856,242. PATENTED JUNE 11, 1907.
R. FULLER.
SELF PROPELLED VEHICLE TRUCK.
APPLICATION FILED JULY 2, 1906.
3 SHEETS—SHEET 1.
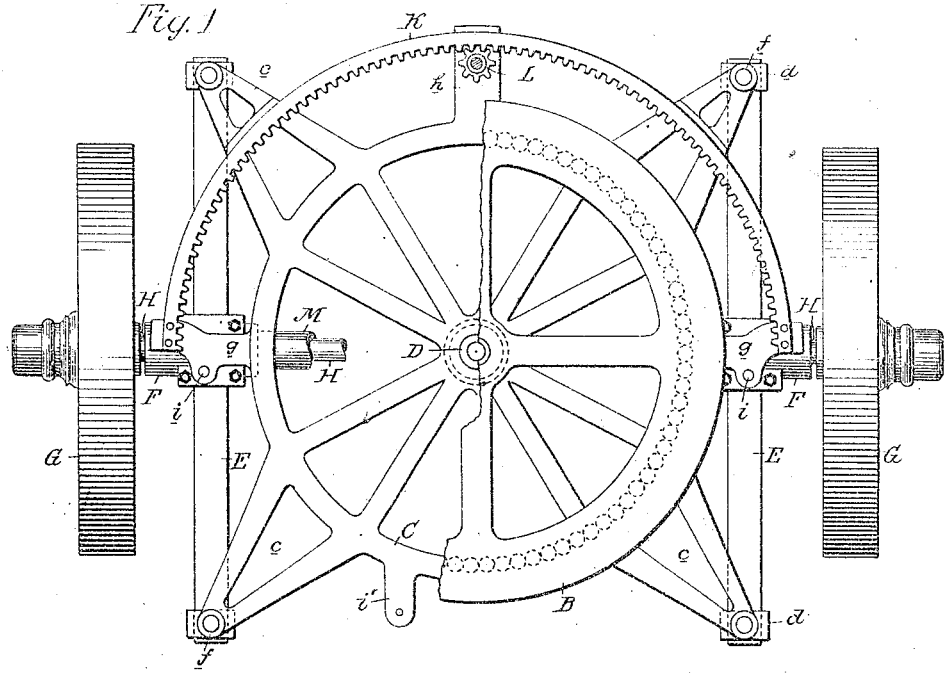
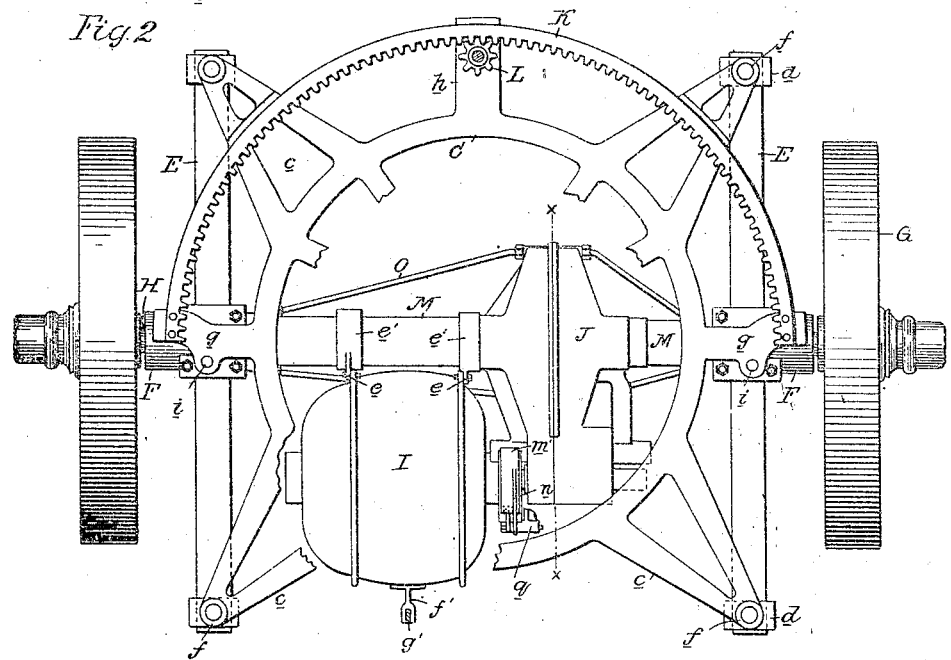
WITNESSES:
Chas. B. Shumway
Thos. B. Longstaff
Rodolphus Fuller
INVENTOR.
BY 
ATTORNEYS No. 856,242. PATENTED JUNE 11, 1907.
R. FULLER.
SELF PROPELLED VEHICLE TRUCK.
APPLICATION FILED JULY 2, 1906.

3 SHEETS—SHEET 2.

WITNESSES:

Rodolphus Fuller
INVENTOR.
BY
ATTORNEYS

No. 856,242. PATENTED JUNE 11, 1907.
R. FULLER.
SELF PROPELLED VEHICLE TRUCK.
APPLICATION FILED JULY 2, 1906.
3 SHEETS—SHEET 3.
Fig. 5
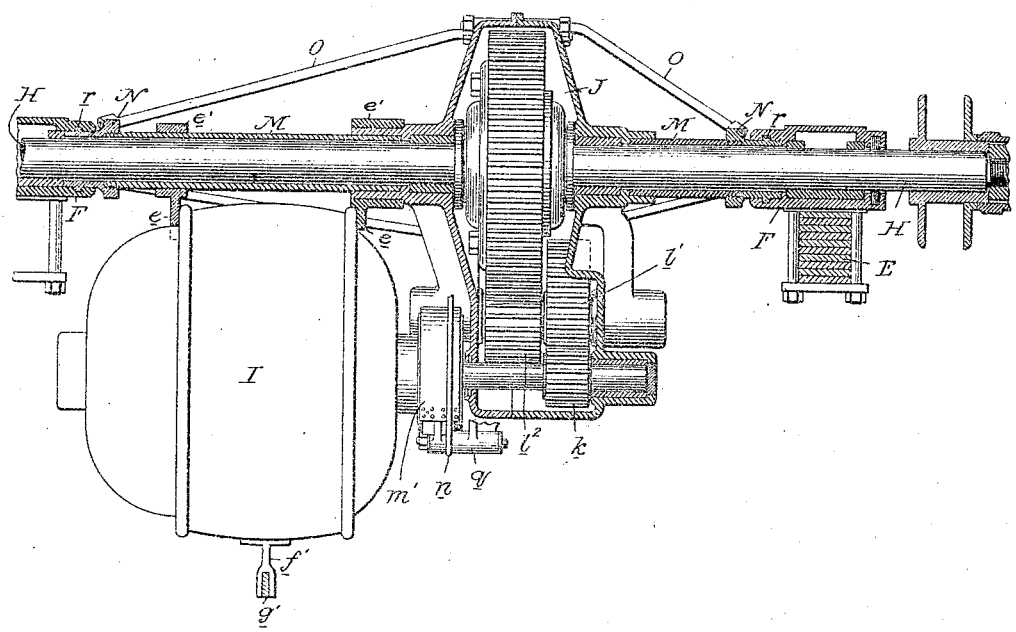
WITNESSES:
Chas. B. Shumway
Thos. B. Longstaff
Rodolphus Fuller
INVENTOR.
BY 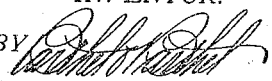
ATTORNEYS

UNITED STATES PATENT OFFICE.

RODOLPHUS FULLER, OF DETROIT, MICHIGAN.

SELF-PROPELLED VEHICLE-TRUCK.

No. 856,242.  Specification of Letters Patent.  Patented June 11, 1907.

Application filed July 2, 1906. Serial No. 324,397.

*To all whom it may concern:*

Be it known that I, RODOLPHUS FULLER, a citizen of the United States of America, residing at Detroit, in the county of Wayne and State of Michigan, have invented certain new and useful Improvements in Self-Propelled Vehicle-Trucks, of which the following is a specification, reference being had therein to the accompanying drawings.

This invention relates to self propelled trucks for vehicles particularly designed for the transportation of merchandise and other heavy articles upon streets and the object is to provide an electrically propelled truck particularly suitable for a vehicle of this character and to this end my invention is embodied in a two-wheeled truck carrying its own electric motor in drive connection with both wheels, all so arranged that by the mere addition or omission of a fifth wheel it is suitable for front or rear truck each truck forming a wholly independent driving unit without any mechanical driving connection with a prime motor, thus leaving the size and form of the platform and the disposition of the prime motor factors which can be varied within wide limits, all as will appear more fully hereinafter.

Figure 4:
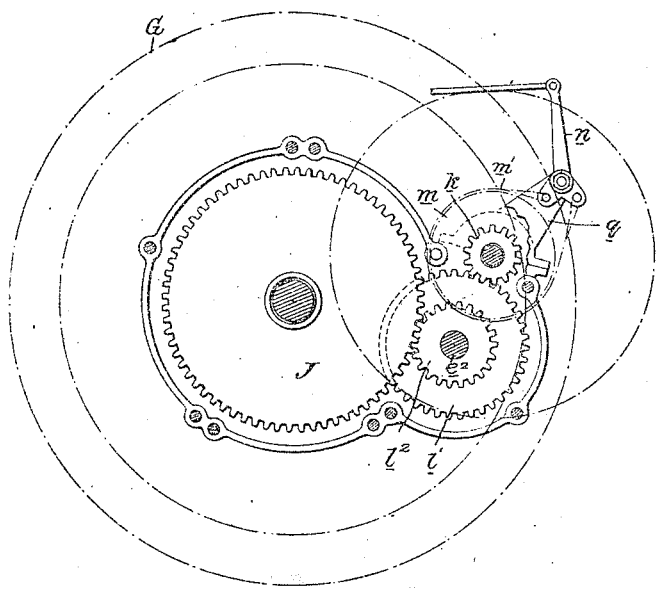

In the drawings which accompany this specification my improved truck is shown specifically as a front truck wherein;

Figures 1 and 2 are plan views thereof with certain parts in each figure broken away to bring underlying parts into view; Fig. 3, is a sectional side elevation; Fig. 4, is a crosssection of Fig. 3 substantially in the plane *x—x* of Fig. 2; Fig. 5, is a sectional plan of the motor drive mechanism.

In the drawings A is the front end of a suitable platform, B and C are respectively the upper and lower circle of a fifth wheel, D is the king pin pivotally connecting the members of the fifth wheel together, E are the springs supporting the lower member of the fifth wheel. F are the journal boxes upon which the springs are mounted. G are the wheels, H are the spindles forming the drive axle to which the wheels are secured. I is an electric motor and J is the compensating gear transmitting the power from the motor to the wheels. K is the steering sector and L is the steering pinion engaging therewith, all these parts being of well known construction and operation except as more fully hereinafter described.

The upper circle of the fifth wheel is secured directly to the under side of the platform which latter is preferably made to extend out over the front truck and is preferably designed to carry thereon the prime mover and the controlling mechanism. A ball bearing is formed between the two circles, the balls of which travel in a circular groove *a* formed in the under side of the upper circle and bear upon a plain upper face of the lower circle thereby keeping the balls clean from dirt or dust.

The king pin D is hollow, it is removably secured in the upper circle and has a collar *b* formed at its lower end. The lower circle is integrally cast with four radially extending brackets portions *c* which support this circle upon the ends of the springs by means of interposed stirrups *d* into which the ends of the springs loosely engage while the opposite ends are pivotally secured therein, the stirrups being pivotally supported in eyes *f* formed in the ends of the brackets *c*.

The steering sector is of the form of a half circle interiorly geared and is secured upon the two forward brackets *c* and upon additional brackets *g g* and *h* also formed on the lower circle, the brackets *g* being provided with stops *i* to limit the sweep of the steering pinion.

The compensating gear is of known construction and inclosed within a two-part steel casing formed with hubs in which the inner ends of the drive spindles are suitably journaled. To the opposite sides of this gear casing are secured the axle sleeve members M which loosely inclose the live spindles and N are flanged collars secured to their outer ends or integrally formed thereon and having a pivotal connection with the journal boxes F, said connection being preferably made by journaling the collar in an inward extension of the journal box and retaining it therein by means of the flange *r* engaging into a corresponding groove in the journal box. The gear casing is further connected with the collar N by tie rods O thus uniting the parts together to form a trussed axle sleeve for supporting the weight while at the same time the intermediate portion thereof between the journal boxes is free to rock independently thereof.

The electric motor is inclosed within an outer dust proof casing and is supported in position by means of suitable brackets *e e* extending from the casing of the motor forwardly and secured by clamping collars *e'* formed at the ends of said brackets to the axle member on one side of the gear casing. Another bracket *f'* extends rearwardly and is pivotally connected to the lower end of a hanger rod *g'* which passes through a guide bracket *i'* extending rearwardly from the lower circle and supported thereon by a spring *j* interposed between the hanger and bracket, a similar check spring *j'* being placed upon the hanger beneath the bracket and held under tension by the screw nuts *j²*.

The motor shaft extends into an enlargement formed in the gear casing and is suitably journaled therein and carries the motor pinion *k* all in a manner to make the motor independently detachable. The enlargement of the gear casing also incloses an intermediate shaft *e²* which carries the gear wheels *l' l²* the former meshing with the motor pinion and the latter with the drive wheel of the compensating gear, which latter is of known construction.

The motor shaft carries upon it in an open interval between the motor casing and the gear casing a brake wheel *m* carrying the usual brake strap *m'* operated by a brake lever *n* which is pivotally mounted upon a bracket *q* extending from the gear casing. An actuating connection connects this brake lever with the usual foot lever (not shown) in proximity to the operators seat and this connection passes through the hollow king bolt in a very direct manner since by a judicious distribution of the parts in locating the motor to one side of the central longitudinal plane and the compensating gear and casing upon the other side the brake wheel is in a central longitudinal plane with the weight of the drive mechanism equally distributed on both sides of the central plane. The hollow king bolt is in like manner used to form the electrical connection with the motor and it is quite obvious that if a mechanical brake would not be admissible a solenoid may take its place.

With the obvious omission of the fifth wheel the construction described applies to the rear truck as well, and the platform will be supported directly upon the springs and the hanger *g'* for the motor will be correspondingly suspended from the platform.

My construction is adapted to many kinds of vehicles where great tractive power is required, it provides wholly independent driving units for the front and rear truck, making the size and shape of the platform, location and arrangement of prime motor and other factors wholly optional within wide limits to suit the peculiar use to which the vehicle is to be put. As a front truck it permits turning the vehicle almost within its own length thus making it especially applicable for hauling merchandise through crowded thoroughfares and loading and unloading the same on depot platforms and warehouses.

Having thus fully described my invention what I claim is:—

1. In a truck for electrically propelled vehicle, the combination of a divided driving axle having drive wheels secured thereon, journal boxes carrying the supporting springs of the truck, a differential gear having a gear casing provided with laterally extending axle sleeve members, connections uniting said members with the journal boxes and permitting relative rotation between them, an electric motor adjacent to one of the axle sleeve members and having its casing secured thereto, means yieldingly suspending the casing of the motor upon its farther side from a suitable part carried by the springs of the truck, and a journal bearing formed in an enlargement of the gear casing adjacent to one end of the motor and into which said motor shaft projects.

2. In a truck for electrically propelled vehicle, the combination of a differentially driven driving axle carrying the drive wheels, journal boxes thereon carrying the supporting springs of the truck, a casing inclosing the differential gear and having laterally extending axle sleeve-members, pivotal connections uniting the journal boxes to the outer ends of said members and permitting relative rotation between them, an electric motor adjacent to one of said axle sleeve members, connections detachably securing the motor to said member, a suspension device yieldingly suspending the motor upon its opposite side from a part of the truck or vehicle supported by the springs of the truck, an enlargement on the gear casing formed with a bearing into which one end of the motor shaft projects and intermediate drive gear inclosed within the enlargement of the gear casing.

3. In a truck for electrically propelled vehicle, the combination of a divided driving axle carrying the two wheels of the truck, journal boxes thereon carrying the supporting springs of the truck, a differential gear, a casing therefor having laterally extending axle sleeve members journaled at their outer ends in bearings in the inner ends of the journal boxes and held against endwise displacement, said members positioning the gear casing to one side of the center of the truck, an electric motor located adjacent to the axle sleeve member upon the opposite side of the center and in rigid supporting connection therewith, a suspension device yieldingly supporting the motor upon the side farthest from the axle from a part of the vehicle or truck carried by the springs of the truck, a bearing formed in an enlargement of the gear casing adjacent to one end of the motor and in which the motor shaft is journaled, and intermediate drive gear between said end and the differential gear.

4. In a truck for electrically propelled vehicle, the combination of a divided driving axle carrying the two wheels of the truck, journal boxes thereon carrying the supporting springs of the truck, a differential gear, a casing therefor having laterally extending axle sleeve members journaled at their outer ends in the inner ends of the journal boxes and endwise united thereto, said members being of a relative length to position the gear casing to one side of the center of the truck, an electric motor located adjacent to the axle sleeve member on the opposite side of the center and in rigid supporting connection with said member, a suspension device yieldingly supporting the motor on the side farthest from the axle from a part of the truck or vehicle supported by the springs of the truck, a bearing formed in an enlargement of the gear casing adjacent to the motor and into which the motor shaft extends, intermediate gear between the motor shaft and the differential gear inclosed in said enlargement, and a brake device carried by the motor shaft between said enlargement and the casing of the motor.

5. In a truck for electrically propelled vehicle, the combination of a divided driving axle carrying the two wheels of the truck, journal boxes thereon carrying the supporting springs of the truck, a differential gear having a gear casing provided with laterally extending axle sleeve members, flanged collars at the outer ends of said members journaled in bearings in the inner ends of the journal boxes and held therein against lateral displacement, truss rods connecting said collars with the gear casing and forming in connection therewith and with the axle sleeve members a rigid supporting truss and an electric motor in rigid supporting connection with said truss.

6. In a truck for electrically propelled vehicle, the combination of a divided driving axle carrying the two wheels of the truck, journal boxes thereon, a differential gear located to one side of the center of the truck, a casing therefor having laterally extending axle sleeve members journaled in the inner ends of the journal boxes and held against endwise displacement therein, and an electric motor located adjacent to the axle sleeve member on the other side of the center of the truck in relation to the gear casing, an enlargement of the gear casing inclosing the intermediate drive mechanism and formed with a bearing in which the motor shaft is journaled, a rigid supporting connection between the motor and the adjacent axle sleeve member, and a suspension device yieldingly supporting the motor from a suitable part of the truck or vehicle carried by the springs.

7. In a front truck for electrically propelled vehicle, the combination of a driving axle carrying the two wheels of the truck, journal boxes thereon, springs mounted upon the journal boxes, a lower circle formed with outwardly extending brackets, stirrups interposed between the ends of the springs and the outer ends of said brackets, an upper circle formed with a ball bearing groove upon its under side, balls interposed in said groove between the upper and lower circle, said lower circle having a plain upper face upon which the balls travel, and a hollow king pin pivotally uniting the upper and lower circles together.

8. In a front truck for electrically propelled vehicle, the combination of a divided driving axle carrying the two wheels of the truck, a differential gear having a gear casing in which the inner ends of the driving axle are journaled, axle sleeve members extending laterally from the gear casing, journal boxes upon the driving axle at the outer ends of the axle sleeve members, connections uniting said journal boxes and the axle sleeve members endwise and permitting relative rotation between them, springs mounted upon the journal boxes, a lower circle mounted upon the springs, an upper circle supported upon the lower circle, a ball bearing between the circles, a hollow king pin pivotally uniting the circles, an electric motor adjacent to and in rigid supporting connection with the axle sleeve member on one side of the gear casing and a suspension device yieldingly supporting the motor from the lower circle said motor having one end of its shaft extending into an enlargement of the gear casing and journaled therein.

9. In a front truck for electrically propelled vehicle, the combination of a divided driving axle carrying the two wheels of the truck, a differential gear having a gear casing in which the inner ends of the driving shaft are journaled, axle sleeve members laterally extending from the gear casing, journal boxes upon the driving axle at the outer ends of the axle sleeve members, connections uniting the journal boxes and axle sleeve member endwise together free to permit relative rotation between them, springs mounted upon journal boxes, a lower circle formed with brackets extending outwardly therefrom over the ends of the springs, stirrups interposed between the ends of the springs and brackets, an upper circle, a ball bearing between the two circles, a hollow king pin uniting the circles together, an electric motor adjacent to and in rigid supporting connection with the axle sleeve member on one side of the gear casing, a suspension device yieldingly supporting the motor from the lower circle, an enlargement on the gear casing adjacent to one end of the motor and formed with a journal bearing into which the motor shaft projects, intermediate drive mechanism inclosed within said enlargement, a brake on the motor shaft intermediate between the gear casing, and the body of the motor—the body of the motor being on one side of the center of the truck and the gear casing upon the other side—and brake connection extending from the brake through the hollow king pin to a suitable part on the vehicle platform.

In testimony whereof I affix my signature in presence of two witnesses.

RODOLPHUS FULLER.

Witnesses:
OTTO F. BARTHEL,
THOS. G. LONGSTAFF.